(12) United States Patent
Xu et al.

(10) Patent No.: US 9,094,491 B2
(45) Date of Patent: Jul. 28, 2015

(54) TERMINAL DEVICE AND MOLDS OF BUTTON SHELL AND INNER SHELL OF TERMINAL DEVICE

(71) Applicant: Huawei Device Co., Ltd., Shenzhen (CN)

(72) Inventors: Zhenguo Xu, Xi'an (CN); Tao Wang, Xi'an (CN); Shifeng Chen, Xi'an (CN)

(73) Assignee: Huawei Device Co., Ltd., Shenzhen (CN)

( * ) Notice: Subject to any disclaimer, the term of this patent is extended or adjusted under 35 U.S.C. 154(b) by 20 days.

(21) Appl. No.: 14/075,387

(22) Filed: Nov. 8, 2013

(65) Prior Publication Data

US 2014/0066141 A1    Mar. 6, 2014

Related U.S. Application Data

(63) Continuation of application No. PCT/CN2012/080525, filed on Aug. 24, 2012.

(30) Foreign Application Priority Data

Aug. 29, 2011    (CN) .................. 2011 2 0318221 U

(51) Int. Cl.
*H04M 1/00* (2006.01)
*H04M 1/02* (2006.01)
*H04M 1/23* (2006.01)

(52) U.S. Cl.
CPC .......... *H04M 1/0237* (2013.01); *H04M 1/0202* (2013.01); *H04M 1/0249* (2013.01); *H04M 1/23* (2013.01)

(58) Field of Classification Search
CPC   H04M 1/0214;  H04M 1/0235;  H04M 1/0237
USPC ............. 455/550.1, 575.4, 575.8, 558, 556.2;
379/433.12; 312/237; 345/27, 87;
361/679.3, 679.1, 679.48
See application file for complete search history.

(56) References Cited

U.S. PATENT DOCUMENTS 6,341,227 B1 *  1/2002  Moster et al. .............. 455/550.1
6,370,362 B1    4/2002  Hansen et al.
(Continued)

FOREIGN PATENT DOCUMENTS

CN        1780305 A    5/2006
CN        2783718 Y    5/2006
(Continued)

OTHER PUBLICATIONS

Foreign Communication From a Counterpart Application, PCT Application No. PCT/CN2012/080525, Chinese Search Report dated Nov. 29, 2011, 9 pages.
Foreign Communication From a Counterpart Application, PCT Application No. PCT/CN2012/080525, Chinese Written Opinion dated Nov. 29, 2011, 5 pages.
(Continued)

*Primary Examiner* — Kiet Doan
(74) *Attorney, Agent, or Firm* — Conley Rose, P.C.; Grant Rodolph; Nicholas K. Beaulieu

(57) ABSTRACT

Embodiments of the present invention disclose a terminal device and molds of a button shell and an inner shell of the terminal device, which can be applied to the technical field of electronic devices. According to the embodiment of the present invention, the button shell and the inner shell can be connected without using an intermediate medium, and the button shell and the inner shell are fixedly connected by sliding between a slide rail on the button shell and a sliding slot on the inner shell, so that materials of the terminal device are saved, and an assembly process of the button shell and the inner shell of the terminal device can be simplified.

15 Claims, 5 Drawing Sheets

(56) References Cited

U.S. PATENT DOCUMENTS

| | | | |
|---|---|---|---|
| 2004/0127270 A1 | 7/2004 | Wulff et al. | |
| 2009/0212675 A1* | 8/2009 | Zhang et al. | 312/237 |
| 2009/0245933 A1* | 10/2009 | Jang | 403/331 |

FOREIGN PATENT DOCUMENTS

| | | | |
|---|---|---|---|
| CN | 201256404 Y | 6/2009 | |
| CN | 101511152 A | 8/2009 | |
| CN | 202332674 U | 7/2012 | |
| EP | 0687970 A1 | 5/1995 | |
| JP | 08320739 A | 12/1996 | |
| JP | 2001036258 A | 2/2001 | |
| JP | 2001245036 A | 9/2001 | |
| JP | 2003319045 A | 11/2003 | |
| JP | 2004336582 A | 11/2004 | |
| JP | 4058675 B2 | 3/2008 | |
| WO | 9741676 A1 | 11/1997 | |

OTHER PUBLICATIONS

Foreign Communication From a Counterpart Application, European Application No. 12827013.9, Extended European Search Report dated May 28, 2014, 7 pages.

Partial English Translation and Abstract of Japanese Patent Application No. JP08-320739A, Dec. 9, 2014, 8 pages.

Partial English Translation and Abstract of Japanese Patent Application No. JP2001-036258A, 2014, 5 pages.

Partial English Translation and Abstract of Japanese Patent Application No. JP2001-245036A, 2014, 6 pages.

Partial English Translation and Abstract of Japanese Patent Application No. JP2004-336582A, 2014, 8 pages.

Foreign Communication From a Counterpart Application, Japanese Application No. 2014-505506, Japanese Office Action dated Oct. 21, 2014, 3 pages.

Foreign Communication From a Counterpart Application, Japanese Application No. 2014-505506, English Translation of Japanese Office Action dated Oct. 21, 2014, 3 pages.

* cited by examiner

TERMINAL DEVICE AND MOLDS OF BUTTON SHELL AND INNER SHELL OF TERMINAL DEVICE

CROSS-REFERENCE TO RELATED APPLICATIONS

This application is a continuation of International Application No. PCT/CN2012/080525, filed on Aug. 24, 2012, which claims priority to Chinese Patent Application No. 201120318221.5 filed on Aug. 29, 2011, both of which are incorporated herein by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the technical field of electronic equipment, and in particular to a terminal device and molds of a button shell and an inner shell of the terminal device.

BACKGROUND

Presently, some terminal devices have physical buttons, and under normal circumstances, this type of terminal device includes a button shell and an inner shell, where physical buttons are disposed at an outer side of the button shell, and on an inner side surface of the button shell, a bump is disposed at a position corresponding to each physical button; and multiple holes are disposed on the inner shell, so that the bumps of the physical buttons can pass through the holes on the inner shell, and are connected to a corresponding circuit in the terminal device, thereby achieving operations on the terminal device by means of the physical buttons.

It can be seen that, in the terminal device, the holes disposed on the inner shell can fix the physical buttons on the button shell, and at the same time, the button shell and the inner shell need to be fastened. In the existing terminal devices, the button shell and the inner shell are fixed by means of an intermediate medium, for example, a screw, an adhesive or a hot melt tool.

According to the existing methods adopted in fastening the button shell and the inner shell in the terminal device, an additional intermediate medium needs to be used, resulting in more materials of the terminal device.

SUMMARY

Embodiments of the present invention provide a terminal device and molds of a button shell and an inner shell of the terminal device, so that the button shell and the inner shell can be fixed without using an intermediate medium, thereby saving materials of the terminal device.

An embodiment of the present invention provides a terminal device, including a button shell and an inner shell. A slide rail is disposed on the button shell, a sliding slot is disposed at a corresponding position of the inner shell, and the slide rail can slide along the sliding slot, so that the button shell and the inner shell are fixedly connected.

An embodiment of the present invention provides a mold of a button shell, where the mold of a button shell is a mold used for manufacturing a button shell in a terminal device. A slide rail is disposed on the button shell, and the slide rail can slide along a sliding slot disposed at a corresponding position of an inner shell of the terminal device, so that the button shell and the inner shell are fixedly connected.

An embodiment of the present invention provides a mold of an inner shell, where the mold of an inner shell is a mold used for manufacturing an inner shell in a terminal device. A sliding slot is disposed on the inner shell, and a slide rail disposed at a corresponding position on the button shell can slide along the sliding slot, so that the button shell and the inner shell are fixedly connected.

According to the embodiments of the present invention, the button shell and the inner shell can be connected without using an intermediate medium, and the button shell and the inner shell are fixedly connected by sliding between the slide rail on the button shell and the sliding slot on the inner shell, so that the materials of the terminal device are saved, thereby simplifying an assembly process of the button shell and the inner shell of the terminal device.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

Figure 1A:
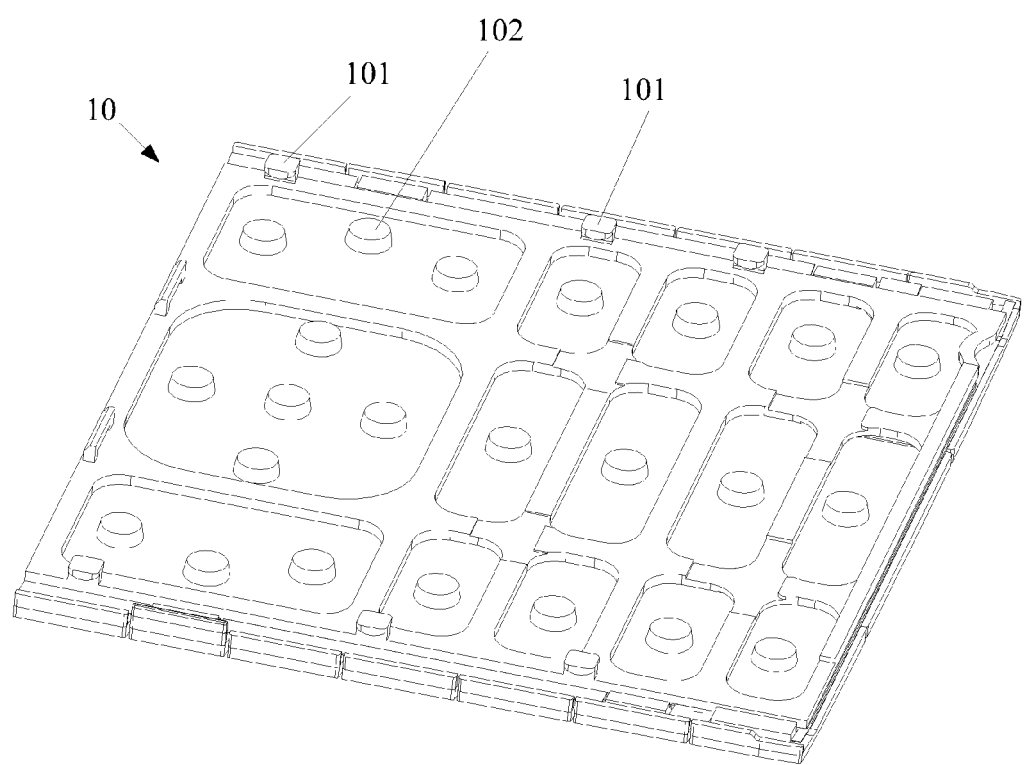
FIG. 1A is a schematic structural diagram of a button shell in a terminal device provided by an embodiment of the present invention.

The technical solutions of the present invention will be clearly described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

A terminal device provided by an embodiment of the present invention includes a button shell and an inner shell. A slide rail is disposed on the button shell, a sliding slot is disposed at a corresponding position of the inner shell, and the slide rail can slide along the sliding slot, so that the button shell and the inner shell are fixedly connected.

It can be understood that, herein, the slide rail disposed on the button shell and the sliding slot disposed on the inner shell may be in any shape, provided that the shape of the slide rail matches with the shape of the sliding slot, so that the slide rail can slide along the sliding slot. For example, when the slide rail has a recessed shape, the sliding slot needs to have a protruding portion to match with the recessed slide rail, and any fitting structures that enable the button shell and the inner shell to be fixedly connected fall within the protection scope of the present invention.

Further, the sliding slot disposed on the inner shell may be a through hole on the inner shell, and may also be a blind hole on the inner shell; and the slide rail is preferably disposed on an inner surface of the button shell, that is, the slide rail is disposed at a side of the button shell where bumps are set, so that the terminal device has a more beautiful appearance. In addition, the sliding slot may be formed from a steel sheet (or other metals) or plastic through molding, and the slide rail may be formed by a plastic through molding, so that the molding process is simple, requirements for manufacturing precision are not high, and the manufacturing cost is low.

It can be seen that, according to the embodiment of the present invention, the button shell and the inner shell can be connected without using an intermediate medium, and the button shell and the inner shell are fixedly connected by sliding between the slide rail on the button shell and the sliding slot on the inner shell, so that materials of the terminal device are saved, thereby simplifying an assembly process of the button shell and the inner shell of the terminal device.

In a specific embodiment, a terminal device includes a button shell 10 and an inner shell 20. The button shell 10 has a structure shown in FIG. 1A, and the inner shell 20 has a structure shown in FIG. 1B.

At least one slide rail 101 is disposed at a side of the button shell 10 where bumps 102 are set, and a width of an end of the slide rail 101 close to the button shell 10 is smaller than a width of an outer end of the slide rail 101.

Two sliding slots 201-1 and 202-2 that are connected to each other are disposed at corresponding positions of the inner shell 20, where a hollow surface of a first sliding slot 201-1 on the inner shell 20 is not smaller than an outer end surface of the slide rail 101, and a width of a second sliding slot 201-2 is not smaller than a width of an end of the slide rail 101 close to the button shell.

Figure 2:
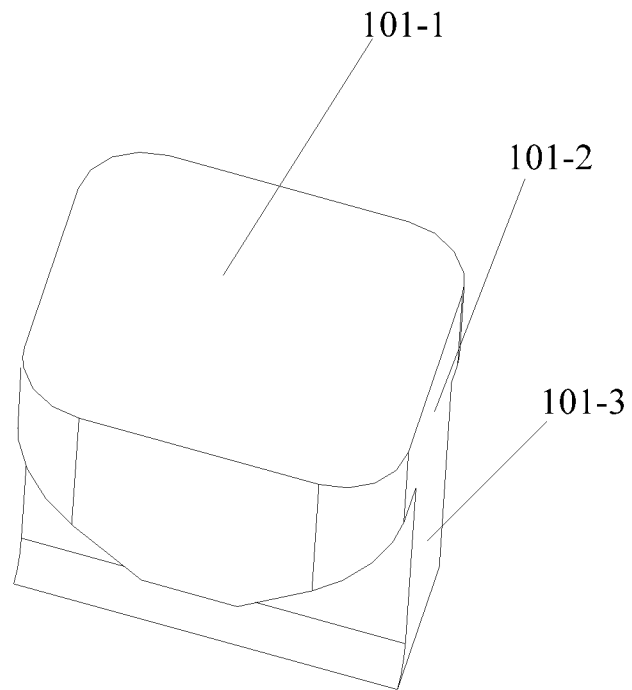
FIG. 2 is a schematic structural diagram of a slide rail disposed on a button shell in an embodiment of the present invention.

Physical buttons are disposed on an outer side surface of the button shell 10, and on an inner side surface of the button shell 10, a bump 102 is disposed at a corresponding position of each physical button, and the slide rail 101 is disposed at a side of the bump 102. The slide rail 101 may be in any shape, for example, as shown in FIG. 2, a width of an end 101-3 of the slide rail 101 close to the button shell is smaller than a width of an outer end 101-2 of the slide rail, so that a cross section of the slide rail 101 is in a "T" shape, or a platform shape, or other shapes with a wide upper end and a narrow lower end.

Multiple holes 202 are disposed on the inner shell 20, so that the bumps 102 of the physical buttons can pass through the holes 202 on the inner shell 20, and are connected to a corresponding circuit in the terminal device, thereby achieving operations on the terminal device by means of the physical buttons. In this embodiment, at least two sliding slots 201-1 and 201-2 that are connected to each other are further disposed on the inner shell 20, so that a hollow surface of a first sliding slot 201-1 on the inner shell 20 is not smaller than an outer end surface 101-1 of the slide rail 101, and a width of a second sliding slot 201-2 is not smaller than a width of an end 101-3 of the slide rail close to the button shell. The sliding slots 201-1 and 201-2 may also be in any shape, provided that the shape of the sliding slots 201-1 and 201-2 match with the shape of the slide rail 101.

It should be noted that, optionally, the slide rail 101 is disposed at an edge of the button shell 10 as far as possible, and the sliding slots 201-1 and 201-2 are disposed at a corresponding position at an edge of the inner shell 20, so that the setting of the slide rail 101 has no influence on other parts on the button shell 10, and at the same time, the settings of the sliding slots 201-1 and 201-2 have no influence on other parts on the inner shell 20.

In this way, in assembling the button shell 10 and the inner shell 20, the outer end 101-2 of the slide rail disposed on the button shell 10 can be placed in the first sliding slot 201-1 on the inner shell 20, and the end 101-3 of the slide rail close to the button shell slides into the second sliding slot 201-2 along the sliding slot 201, so that the button shell 10 and the inner shell 20 are fixedly connected without using an intermediate medium.

If a width of the second sliding slot 201-2 is smaller than a width of the outer end 101-2 of the slide rail, the outer end 101-2 of the slide rail cannot easily slide out from the second sliding slot 201-2, thereby further fastening connection of the button shell 10 and the inner shell 20.

Figure 3:
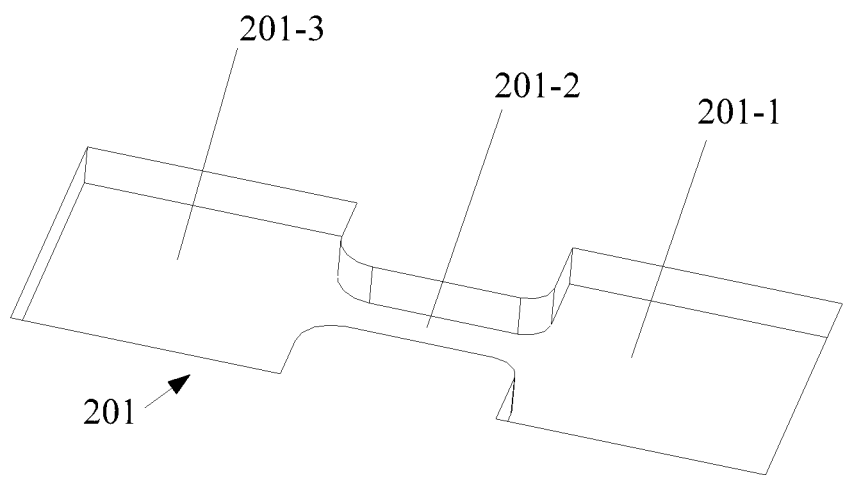
FIG. 3 is a schematic structural diagram of a sliding slot disposed on an inner shell in an embodiment of the present invention.

In another specific embodiment, referring to a structural diagram of a sliding slot 201 shown in FIG. 3, in an inner shell 20, besides a first sliding slot 201-1 and a second sliding slot 201-2, a third sliding slot 201-3 connected to the second sliding slot 201-2 may be further set. A hollow surface of the third sliding slot 201-3 on the inner shell 20 is not smaller than an outer end surface 101-1 of a slide rail. In this way, in assembling the button shell 10 and the inner shell 20, an outer end 101-2 of the slide rail disposed on the button shell 10 can be placed in the first sliding slot 201-1 or the third sliding slot 201-3 on the inner shell 20, thereby further facilitating assembling the button shell 10 and the inner shell 20.

Figure 4A:
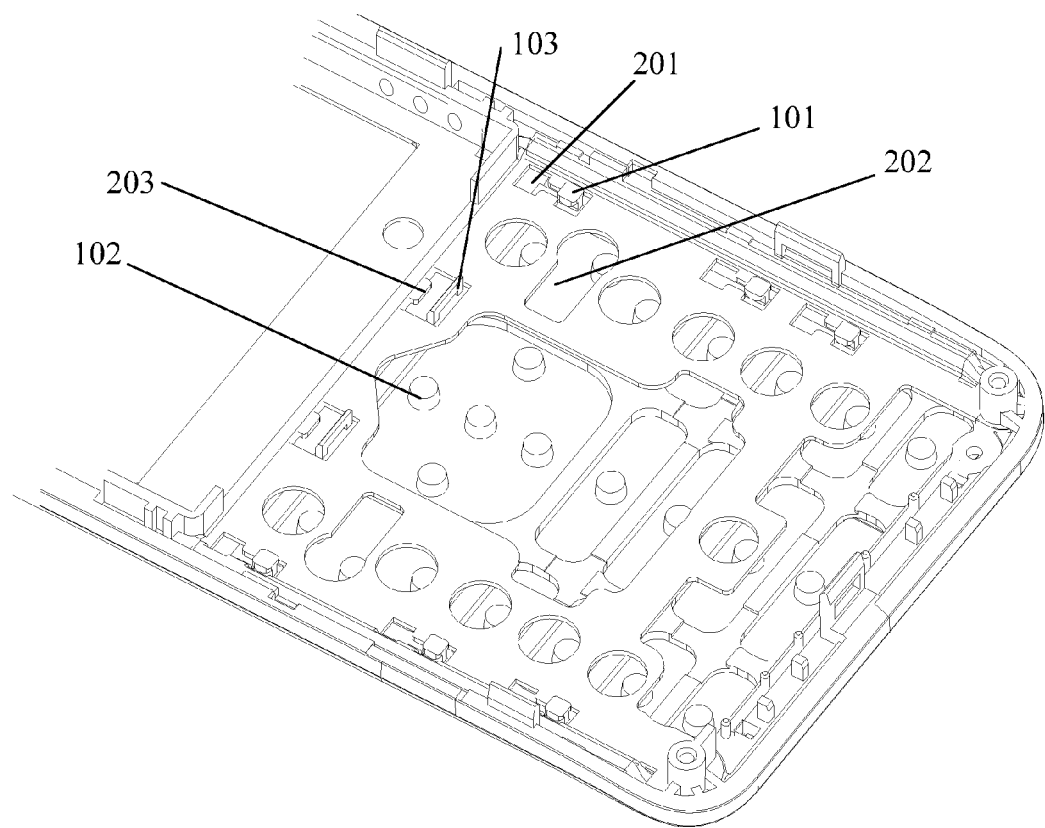
FIGS. 4A and 4B are diagrams showing an assembly process of a button shell and an inner shell in an embodiment of the present invention.
Figure 4B:
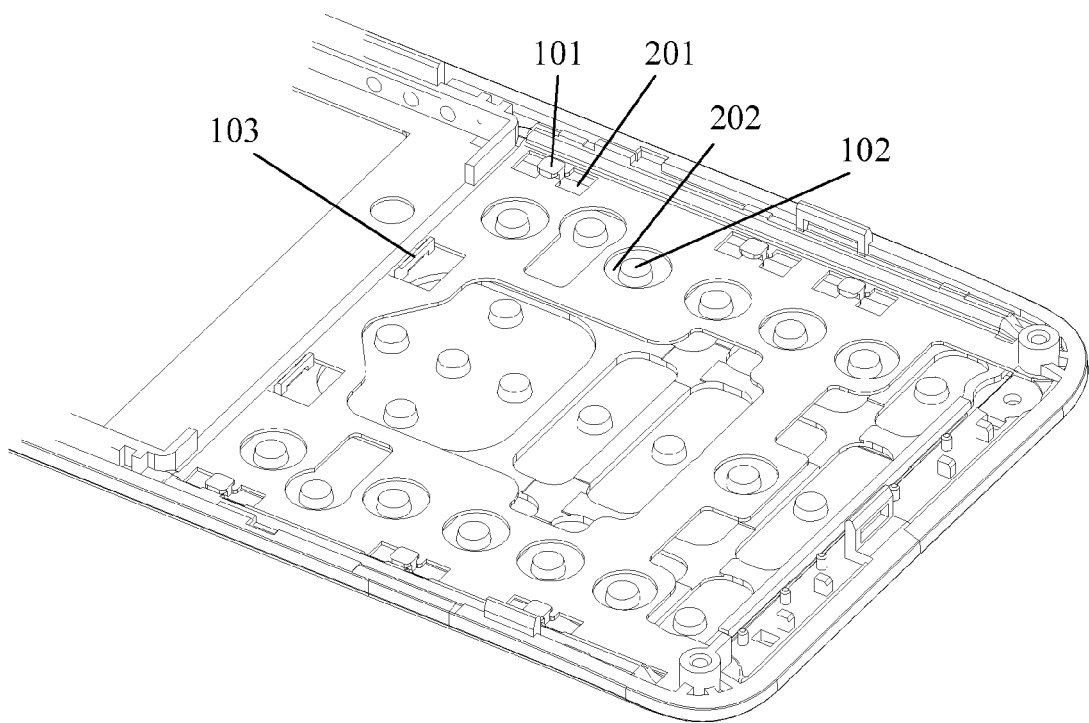

Further, as is shown in FIGS. 4A and 4B, a stopping block 103 may be disposed at an end part of the button shell 10, so that when the slide rail 101 slides along the sliding slot 201, and the stopping block 103 blocks the inner shell 20, the button shell 10 and the inner shell 20 are fixedly connected, that is, when the stopping block 103 blocks the inner shell 20, an end 101-3 of the slide rail close to the button shell can just slide into the second sliding slot 201-2.

Preferably, a groove may be disposed on the stopping block 103, and a protrusion 203 matching with the groove is disposed at a corresponding position of the inner shell 20, so that when the stopping block 103 blocks the inner shell 20, the protrusion 203 is engaged with the groove.

Referring again to FIGS. 4A and 4B, in this embodiment, in assembling a button shell 10 and a inner shell 20, first, an outer end 101-2 of a slide rail disposed on the button shell 10 needs to be placed in a first sliding slot 201-1 or third sliding slot 201-3 on an inner shell 20, and bumps 102 on the button shell 10 need to be placed in holes 202 of the inner shell 20.

When an end 101-3 of the slide rail close to the button shell slides along a sliding slot 201, and a stopping block 103 blocks an inner shell 20, a protrusion 203 on the inner shell 20 is engaged with a groove on the stopping block 103, and at this time, the button shell 10 and the inner shell 20 are fixedly connected, that is, the end 101-3 of the slide rail close to the button shell slides into a second sliding slot 201-2.

In disassembling the button shell 10 and the inner shell 20, the groove of the stopping block 103 and the protrusion 203 on the inner shell 20 are disengaged, and the end 101-3 of the slide rail close to the button shell slides into the first sliding slot 201-1 or the third sliding slot 201-3 along the sliding slot 101, that is, the slide rail 101 disposed on the button shell 10 is removed from the sliding slot 101.

An embodiment of the present invention further provides a mold of a button shell, where the mold is a mold used for manufacturing the button shell of the terminal device according to the embodiments of the present invention, and as for the structure of the button shell of the terminal device, reference can be made to the structure of the button shell according to the embodiment corresponding to FIG. 1A, which is not described herein again.

Figure 1B:
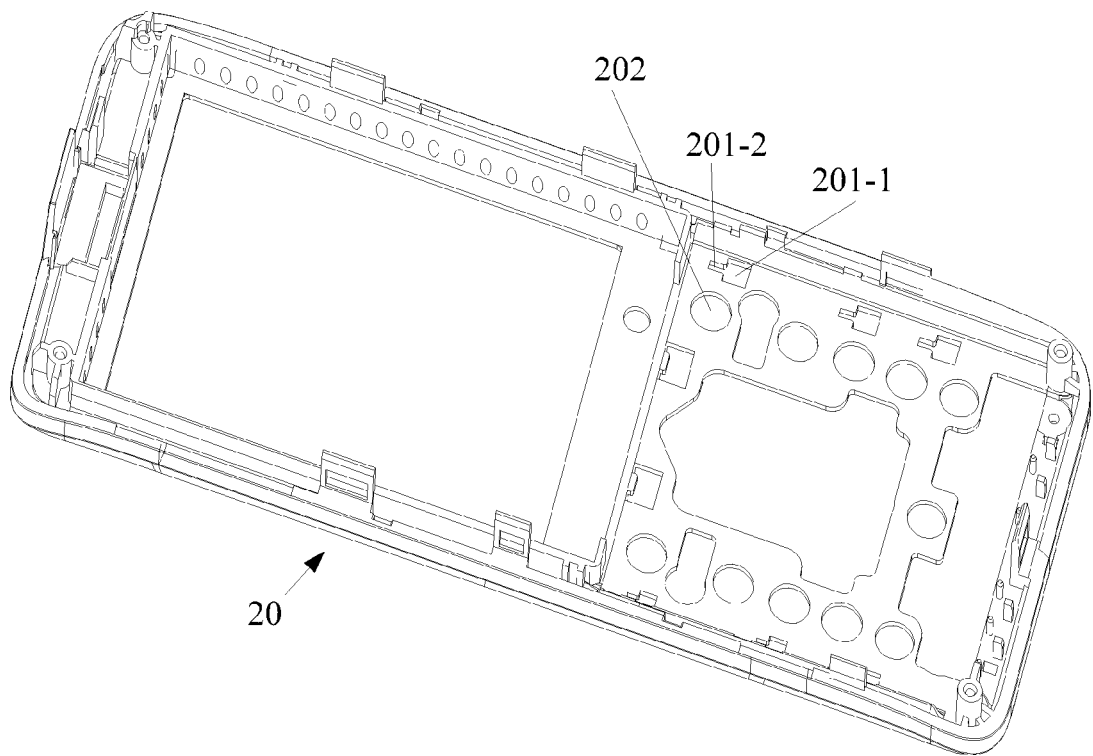
FIG. 1B is a schematic structural diagram of an inner shell in a terminal device provided by an embodiment of the present invention.

An embodiment of the present invention further provides a mold of an inner shell, where the mold is a mold used for manufacturing the inner shell of the terminal device according to the embodiments of the present invention, and as for the structure of the inner shell of the terminal device, reference can be made to the structure of the inner shell according to the embodiment corresponding to FIG. 1B, which is not described herein again.

The terminal device and the mold of a button shell and an inner shell provided by embodiments of the present invention are descried in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A terminal device, comprising:
   a button shell; and
   an inner shell,
   wherein a slide rail is disposed on the button shell,
   wherein a sliding slot is disposed at a corresponding position of the inner shell,
   wherein the slide rail is configured to slide along the sliding slot such that the button shell and the inner shell are fixedly connected,
   wherein at least one slide rail is disposed at a side of the button shell where bumps are set,
   wherein a width of an end of the slide rail close to the button shell is smaller than a width of an outer end of the slide rail,
   wherein two sliding slots that are connected to each other are disposed at corresponding positions of the inner shell,
   wherein a hollow surface of a first sliding slot on the inner shell is not smaller than an outer end surface of the slide rail, and
   wherein a width of a second sliding slot is not smaller than a width of an end of the slide rail close to the button shell.

2. The terminal device according to claim 1, wherein the inner shell further comprises a third sliding slot that is connected to the second sliding slot, and wherein a hollow surface of the third sliding slot on the inner shell is not smaller than the outer end surface of the slide rail.

3. The terminal device according to claim 1 wherein a stopping block is disposed at an end part of the button shell such that when the slide rail slides along the sliding slot and the stopping block blocks the inner shell, the button shell and the inner shell are fixedly connected.

4. The terminal device according to claim 3, wherein a groove is disposed on the stopping block, and wherein a protrusion matching with the groove is disposed at a corresponding position of the inner shell such that when the stopping block blocks the inner shell, the protrusion is engaged with the groove.

5. The terminal device according to claim 1 wherein the slide rail is disposed at an edge of the button shell, and wherein the sliding slot is disposed at a corresponding position at an edge of the inner shell.

6. An apparatus, comprising:
   a button shell mold configured to manufacture a button shell for use in a terminal device,
   wherein the terminal device comprises the button shell and an inner shell,
   wherein a slide rail is disposed on the button shell,
   wherein a sliding slot is disposed at a corresponding position of the inner shell,
   wherein the slide rail is configured to slide along the sliding slot such that the button shell and the inner shell are fixedly connected,
   wherein at least one slide rail is disposed at a side of the button shell where bumps are set,
   wherein a width of an end of the slide rail close to the button shell is smaller than a width of an outer end of the slide rail,
   wherein two sliding slots that are connected to each other are disposed at corresponding positions of the inner shell,
   wherein a hollow surface of a first sliding slot on the inner shell is not smaller than an outer end surface of the slide rail, and
   wherein a width of a second sliding slot is not smaller than a width of an end of the slide rail close to the button shell.

7. The apparatus according to claim 6, wherein the inner shell further comprises a third sliding slot that is connected to the second sliding slot, and wherein a hollow surface of the third sliding slot on the inner shell is not smaller than the outer end surface of the slide rail.

8. The apparatus according to claim 6 wherein a stopping block is disposed at an end part of the button shell such that when the slide rail slides along the sliding slot and the stopping block blocks the inner shell, the button shell and the inner shell are fixedly connected.

9. The apparatus according to claim 8, wherein a groove is disposed on the stopping block, and wherein a protrusion matching with the groove is disposed at a corresponding position of the inner shell such that when the stopping block blocks the inner shell, the protrusion is engaged with the groove.

10. The apparatus according to claim 6 wherein the slide rail is disposed at an edge of the button shell, and wherein the sliding slot is disposed at a corresponding position at an edge of the inner shell.

11. An apparatus, comprising:
   an inner shell mold configured to manufacture an inner shell for use in a terminal device,
   wherein the terminal device comprises a button shell and the inner shell.,
   wherein a slide rail is disposed on the button shell,
   wherein a sliding slot is disposed at a corresponding position of the inner shell,
   wherein the slide rail is configured to slide along the sliding slot such that the button shell and the inner shell are fixedly connected,
   wherein at least one slide rail is disposed at a side of the button shell where bumps are set,
   wherein a width of an end of the slide rail close to the button shell is smaller than a width of an outer end of the slide rail, wherein two sliding slots that are connected to each other are disposed at corresponding positions of the inner shell, wherein a hollow surface of a first sliding slot on the inner shell is not smaller than an outer end surface of the slide rail, and wherein a width of a second sliding slot is not smaller than a width of an end of the slide rail close to the button shell.

12. The apparatus according to claim 11, wherein the inner shell further comprises a third sliding slot that is connected to the second sliding slot, and wherein a hollow surface of the third sliding slot on the inner shell is not smaller than the outer end surface of the slide rail.

13. The apparatus according to claim 11, wherein a groove is disposed on the stopping block, and wherein a protrusion matching with the groove is disposed at a corresponding position of the inner shell such that when the stopping block blocks the inner shell, the protrusion is engaged with the groove.

14. The apparatus according to claim 13, wherein a groove is disposed on the stopping block, and wherein a protrusion matching with the groove is disposed at a corresponding position of the inner shell such that when the stopping block blocks the inner shell, the protrusion is engaged with the groove.

15. The apparatus according to claim 11, wherein the slide rail is disposed at an edge of the button shell, and wherein the sliding slot is disposed at a corresponding position at an edge of the inner shell.

\* \* \* \* \*

UNITED STATES PATENT AND TRADEMARK OFFICE
CERTIFICATE OF CORRECTION

PATENT NO.         : 9,094,491 B2
APPLICATION NO.    : 14/075387
DATED              : July 28, 2015
INVENTOR(S)        : Zhenguo Xu et al.

It is certified that error appears in the above-identified patent and that said Letters Patent is hereby corrected as shown below:

On The Title Page, Item (30) Foreign Application Priority Data Section should read:

Aug. 29, 2011 (CN)..................... 201120318221.5

In the Claims

Column 6, Line 4, Claim 5 should read:

The terminal device according to claim 1, wherein the slide rail is disposed at an edge of the button shell, and wherein the sliding slot is disposed at a corresponding position at an edge of the inner shell.

Column 6, Line 37, Claim 8 should read:

The apparatus according to claim 6, wherein a stopping block is disposed at an end part of the button shell such that when the slide rail slides along the sliding slot and the stopping block blocks the inner shell, the button shell and the inner shell are fixedly connected.

Column 6, Line 48, Claim 10 should read:

The apparatus according to claim 6, wherein the slide rail is disposed at an edge of the button shell, and wherein the sliding slot is disposed at a corresponding position at an edge of the inner shell.

Signed and Sealed this
Ninth Day of February, 2016

Michelle K. Lee
*Director of the United States Patent and Trademark Office*

CERTIFICATE OF CORRECTION (continued)
U.S. Pat. No. 9,094,491 B2

Column 6, Line 56, Claim 11 should read:

An apparatus, comprising:
  an inner shell mold configured to manufacture an inner shell for use in a terminal device,
  wherein the terminal device comprises a button shell and the inner shell,
  wherein a slide rail is disposed on the button shell,
  wherein a sliding slot is disposed at a corresponding position of the inner shell,
  wherein the slide rail is configured to slide along the sliding slot such that the button shell and the inner shell are fixedly connected,
  wherein at least one slide rail is disposed at a side of the button shell where bumps are set,
  wherein a width of an end of the slide rail close to the button shell is smaller than a width of an outer end of the slide rail,
  wherein two sliding slots that are connected to each other are disposed at corresponding positions of the inner shell,
  wherein a hollow surface of a first sliding slot on the inner shell is not smaller than an outer end surface of the slide rail, and
  wherein a width of a second sliding slot is not smaller than a width of an end of the slide rail close to the button shell.